(No Model.)
P. W. TILLINGHAST.
DEVICE FOR REPAIRING PNEUMATIC TIRES.
No. 516,691. Patented Mar. 20, 1894.
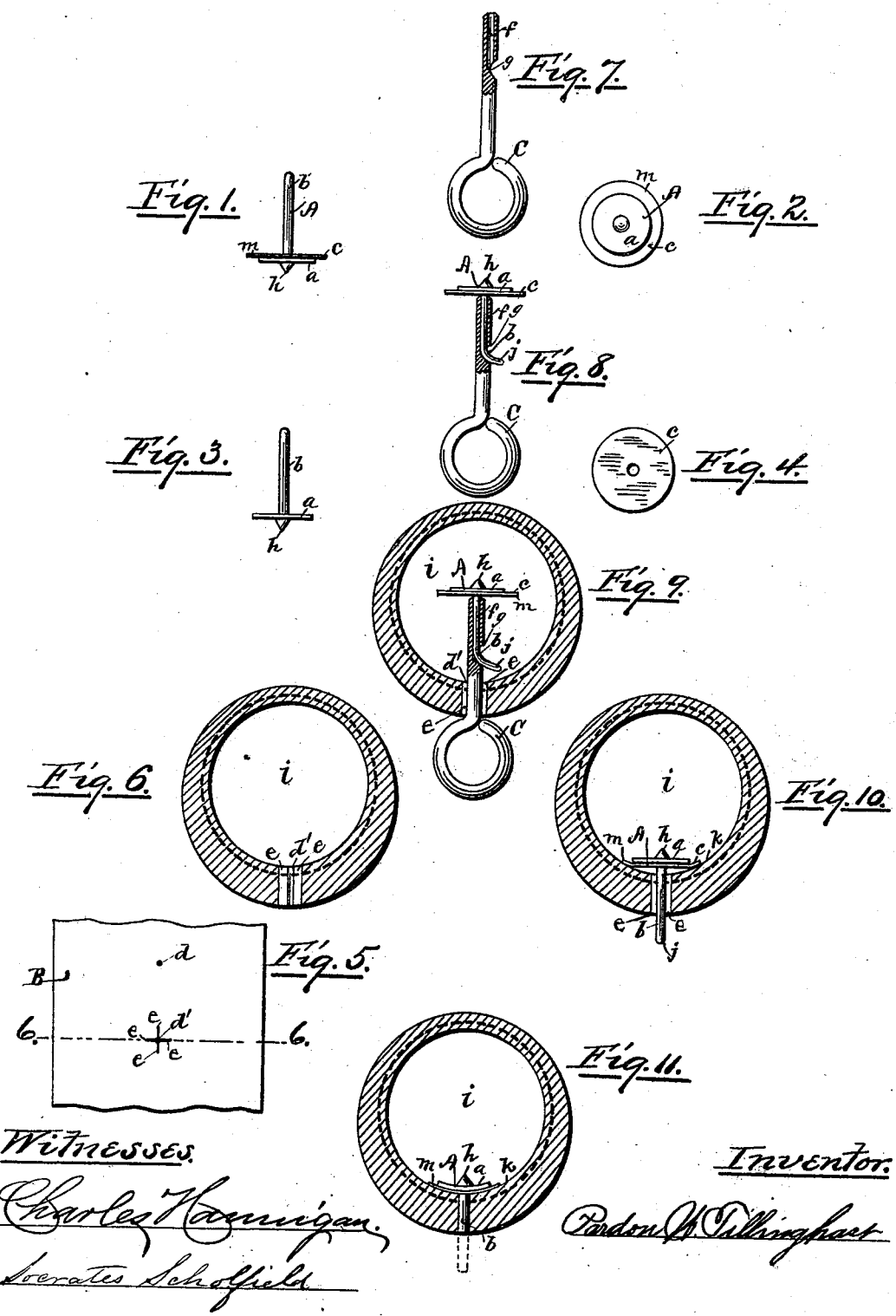
Witnesses.
Charles Hannigan.
Socrates Scholfield
Inventor.
Pardon W. Tillinghast

UNITED STATES PATENT OFFICE.

PARDON W. TILLINGHAST, OF PROVIDENCE, RHODE ISLAND, ASSIGNOR TO THE SECURITY PNEUMATIC TIRE COMPANY, OF JERSEY CITY, NEW JERSEY.

DEVICE FOR REPAIRING PNEUMATIC TIRES.

SPECIFICATION forming part of Letters Patent No. 516,691, dated March 20, 1894.

Application filed November 17, 1892. Serial No. 452,309. (No model.)

*To all whom it may concern:*

Be it known that I, PARDON W. TILLINGHAST, a citizen of the United States, residing at Providence, in the State of Rhode Island, have invented a new and useful Improvement in Devices for Repairing Pneumatic Tires, of which the following is a specification.

Pneumatic tires for vehicles are very liable to be punctured by contact with nails, tacks, and broken pieces of glass encountered in the road, thus causing the air to escape from the tire to the great annoyance and discomfort of the rider; and it is the object of my invention to provide a convenient and effective device for making the required repairs when on the road, the said device being also applicable for repairing other hollow articles of rubber; and my invention consists in the combination with a flexible disk adapted for folding to a smaller diameter, and an attached flexible stem, of a patch of uncured rubber at the inner side of the flexible disk, and it also consists in the improved tool for inserting the same to close the puncture in the tire, as hereinafter fully set forth.

In the accompanying drawings:—Figure 1, represents a side view of my improved device for closing a puncture or cut in a pneumatic tire. Fig. 2, represents an end view of the same. Fig. 3, represents a side view of the flexible disk and the attached flexible stem. Fig. 4, represents a face view of the patch of uncured rubber. Fig. 5, represents a portion of a pneumatic tire, showing a puncture in the tire, and the method of preparing a puncture for the reception of the repairing device. Fig. 6, represents a transverse section taken in the line 6, 6, of Fig. 5. Fig. 7, represents a partial section of a convenient instrument for inserting the repairing device into the prepared perforation in the tire. Fig. 8, represents the same with the repairing device threaded therein preparatory to its insertion. Fig. 9, represents the same when inserted in the perforation of the tire. Fig. 10, represents the position of the repairing device when the inserting instrument has been removed. Fig. 11, represents the properly closed perforation.

Heretofore devices for repairing pneumatic tires have been made by employing an elastic plug consisting of a stem and folding disk, but in all cases the device has been made of vulcanized rubber and depending on rubber solution to hold the two vulcanized surfaces together. This is a very difficult thing to accomplish owing to the lack of adhesive properties of vulcanized rubber and the constant action or flexing of the tire tending to separate the cemented parts, and it is necessary that the parts cemented should be at rest several hours until the cement is thoroughly dry. In my invention an uncured or unvulcanized patch or washer is employed in combination with the flexible disk, which is made to quickly and firmly adhere to any rubber surface by moistening the attaching surface of the uncured patch with cement, naphtha or other solvent of rubber, this quickly acts on the exposed surface of the uncured rubber patch tending to dissolve it, and on the immediate evaporation of the naphtha the said patch will become almost inseparably united to any rubber surface with which it may come in contact.

In the drawings A, Fig. 1, represents the improved device for repairing pneumatic tires, the said device consisting of the flexible disk $a$, which is preferably made of a piece of canvas, vulcanized to a flexible rubber stem $b$, and at the inner side of the disk $a$, is placed the uncured rubber patch $c$, which may be either made in the form of a washer as shown in Fig. 4, and passed over the stem $b$ to contact with the disk $a$, or be otherwise constructed and attached to the inner face of the disk.

A puncture $d$ in the tire B, caused by the insertion of a nail or tack, may be mended by inserting the blade of a penknife into the puncture, so as to form the radial cuts $e$, $e$, extending outwardly from the puncture, as shown at $d'$ in Fig. 5, which represents the puncture when properly prepared for the insertion of the repairing device, the stem $b$ of which is to be inserted into the bore $f$ of the holder C, and drawn out at the eye $g$, as shown in Fig. 8. The repairing device thus threaded in the holder is to be inserted into the prepared perforation $d'$, as shown in Fig. 9, the sides of the perforation and the cuts e, e, being preferably first moistened with rubber cement in any suitable manner, in order to lubricate the opening for the free passage of the head h and the folding disk a, the said disk a with the attached patch c again springing back to its original flat condition upon reaching the cavity i of the tire. The inserting holder C is now to be withdrawn from the perforation, the projecting end j of the stem b folding over at the eye g, by contact with the inner surface of the tire, thus serving to prevent the loss of the patch inside of the tire by the premature withdrawal of the said stem from the bore f of the inserting holder; and upon the complete withdrawal of the holder C, the repairing device A will be held in the perforation, as represented in Fig. 10. Rubber cement in sufficient quantity to cover and moisten the attaching surfaces is now to be injected into the perforation around the stem b, and under the uncured patch c, by the employment of a suitable injecting nozzle adapted for insertion alongside of the stem b, and by means of the projecting end j, of the stem b, the disk and the rubber patch may be pulled back to a proper seating against the side k of the tire, as shown in Fig. 11. The naphtha of the rubber cement operates to soften the surface of the uncured rubber patch and causes its perfect adhesion to the wall of the tire upon the immediate evaporation of the naphtha solvent. When the operation is completed the projecting end j of the stem b, may be cut off, and the tire will be ready for use. The rubber patch c is preferably made of greater diameter than the diameter of the disk a, in order to provide a properly flexible and elastic edge m for attachment to the wall of the tire, but the said patch may be made of the same diameter as that of the disk, or even less, in carrying out my invention.

It is to be understood that when the perforation is made by a piece of glass or other object in the form of a cut, instead of a circular puncture d, the preliminary cuts e, e, to enlarge the puncture sufficiently to allow the entrance of the disk a, in a folded condition, may be omitted, and that when the original cut, or the preliminary cuts e, e, are made of considerable extent, the preliminary moistening with rubber cement previous to the insertion of the repairing device, may also be omitted; and that the disk a, may be made of vulcanized rubber, without the insertion of canvas, and that the flexible stem b may be made of string, instead of rubber, in carrying out my invention.

I claim as my invention—

1. The device for repairing pneumatic tires, consisting of the flexible disk, the flexible stem, and the uncured rubber patch, substantially as described.

2. The device for repairing pneumatic tires, consisting of the flexible disk of canvas, the flexible stem, and the uncured rubber patch, substantially as described.

3. The device for repairing pneumatic tires, consisting of the flexible disk, the flexible stem, and the uncured rubber patch of greater diameter than the disk, substantially as described.

PARDON W. TILLINGHAST.

Witnesses:
S. SCHOLFIELD,
JAMES W. BEUMAN.